United States Patent
Hjelmström et al.

(10) Patent No.: US 11,711,622 B2
(45) Date of Patent: Jul. 25, 2023

(54) ARRANGEMENT FOR ASSESSING AMBIENT LIGHT IN A VIDEO CAMERA

(71) Applicant: Axis AB, Lund (SE)

(72) Inventors: Jonas Hjelmström, Lund (SE); Ola Håkansson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/591,651

(22) Filed: Feb. 3, 2022

(65) Prior Publication Data
US 2022/0294958 A1    Sep. 15, 2022

(30) Foreign Application Priority Data
Mar. 12, 2021  (EP) ..................................... 21162293

(51) Int. Cl.
*H04N 23/75*    (2023.01)
*G01J 1/04*    (2006.01)

(52) U.S. Cl.
CPC ............ *H04N 23/75* (2023.01); *G01J 1/0411* (2013.01)

(58) Field of Classification Search
CPC ............................... H04N 5/238; G01J 1/0411
See application file for complete search history.

(56) References Cited

U.S. PATENT DOCUMENTS

| 3,782,255 A | 1/1974 | Boerner |
| 4,561,752 A | 12/1985 | Miyamoto et al. |
| 2012/0241891 A1* | 9/2012 | Maryfield .............. G02B 23/12 |
| | | 257/E31.127 |
| 2013/0248691 A1 | 9/2013 | Mirov et al. |
| 2016/0202115 A1 | 7/2016 | Lam |
| 2019/0327400 A1 | 10/2019 | Bai |

FOREIGN PATENT DOCUMENTS

| CN | 207491072 U | 6/2018 |
| JP | 2005-037490 A | 2/2005 |
| WO | 2020/151942 A1 | 7/2020 |

OTHER PUBLICATIONS

Extended European Search Report dated Aug. 5, 2021 for European Patent Application No. 21162293.1.

* cited by examiner

*Primary Examiner* — Minh Q Phan
(74) *Attorney, Agent, or Firm* — Volpe Koenig

(57) ABSTRACT

An arrangement for determining an amount of light reaching an image sensor of a video camera is disclosed. The video camera comprises an imaging lens system guiding a beam path towards an image sensor and has an aperture plane where a variable aperture is arranged. The inventive arrangement comprises a light sensor arranged to probe light intensity continuously from a portion of the beam path, which portion is located in or near the aperture plane of the imaging lens system.

6 Claims, 3 Drawing Sheets

ARRANGEMENT FOR ASSESSING AMBIENT LIGHT IN A VIDEO CAMERA

FIELD OF INVENTION

The present invention relates to an arrangement, in a video camera, for assessing a measure of ambient light in the operation of a video camera. The invention also relates to imaging optics comprising such arrangement, and a video camera comprising the same.

TECHNICAL BACKGROUND

The use of IR (infra-red) filters for cameras is well known in the art, and in particular in relation to digital cameras. In short, the image sensor of the camera has a spectral response with a non-negligible component in the infrared, resulting in opportunities as well as in challenges. An opportunity lies in that in low-light conditions the IR-component may provide useful additional information about the imaged scene, information which may be enhanced even further by means of an IR-light source. During day-time imaging, where there is ample light to provide color imaging, the presence of an IR-component may distort or destroy the color balance in the image.

A way of maintaining the beneficial effects while suppressing the less beneficial effects is to add a movable IR-cut filter in the beam path in front of the image sensor during day-mode operation, such that the IR-component is removed. In this way, the IR filter may be used during daylight conditions, enabling acquisition of color images. During day-mode operation pixels of the image sensor will operate in a spectrally resolved manner, where the incident light detected as a charge on individual photodetectors. Each photodetector is provided with filter so as to receive mainly red, mainly green, or mainly blue radiation, thus enabling color separation. This is well-known technology, and a Bayer filter is an example of such a color filter array that may be used. During night-mode operation, e.g., in low-light conditions, the IR-cut filter may be removed. This means that there will be an increase in incoming light (or radiation) emanating from the IR-portion of the spectrum, an increase that can be used to improve the image quality but with the price of render color imaging difficult or impossible, since every color channel has a response in the IR-region. This will skew the color information by the addition of an unknown factor in each color channel. Therefore, instead of performing a color separation during night-mode operation, the only parameter being maintained is the total intensity of the incoming radiation, for each pixel, which may be presented as a gray-scale intensity image (or in any desirable color scale). The addition of an IR light source may enhance the image even further.

In the straightforward solution an IR-cut filter is arranged in front of the sensor, and an actuator is used for moving the filter between a position in which it completely covers the sensor ('day-mode') and a position in which it is completely removed from obscuring the image sensor ('night-mode'). When, starting from night-mode and a retracted filter, the IR-cut filter has been inserted, the image sensor can deduce if the amount of ambient light is sufficient or not. If it is not, the camera will switch back to night mode. When switching from night-mode to day-mode it is not uncommon that the light level with the IR-filter in the beam path is too low, and that a switch back to night-mode is necessary, resulting in a back-and-forth flickering between night-mode and day-mode. This results in noticeable flickering of the image, and a considerable wear on the actuator. Consequently, switching back and forth is not beneficial to user experience, and therefore there may be an assessment prior to the switch, in which the imaging unit tries to deduce the amount of visible light in the scene so as to be certain that a switch to day-mode is advisable.

An arrangement which enables improvements in the assessment of ambient light in a scene, may be used in many circumstances, but has particular advantages when operating in night-mode and deciding whether a transfer to day-mode would be advisable or not.

SUMMARY

In an effort to eliminate or alleviate the problems present in prior art the present embodiments aim at providing an arrangement for determining an amount of light reaching an image sensor of a video camera. The video camera comprises an imaging lens system guiding a beam path towards an image sensor, and have an aperture plane in which a variable aperture is arranged. A light sensor is also provided, and the arrangement is characterized in that the light sensor arranged to probe light intensity continuously from a portion of the beam path, wherein the portion is located in or near the aperture plane of the imaging lens system.

Having the probed portion located in or near the aperture plane is what results in some major advantages. However, the fact that the light sensor is arranged to probe the light intensity will also result in some advantages. The light sensor does not have to probe the light intensity continuously, even if it is arranged such as to enable continuous probing (measurements), and advantages are related to the fact that it can do it at any time. In particular, it is possible to perform measurements while video is being acquired, which is a great advantage in situations where, e.g., continuous recording of surveillance video is required. Further effects and advantages of the present invention and embodiments thereof will be discussed in the detailed description.

In one or more embodiments the probing is configured to be performed on or near an optical axis of the lens system. There are some advantages with performing the probing in or near the optical axis of the lens system. Firstly, it will provide a symmetrical position for the measurement, and if the probing induces additional stray light or minor distortions the risk of these being visible will be reduced. Secondly, there will always be light in or near the optical axis, unless the variable aperture is completely closed, in which case no light will reach the image sensor anyway. This enables for the probing to be performed with a statically arranged means (examples of which will follow). Thirdly, the further from the aperture plane (note, NOT the optical axis) the aperture plane is being performed, the greater the position of the probing with correlate with a position in the image plane. Given that the most relevant portion of an imaged scene will be located near a central portion of the image sensor (i.e., on or near the optical axis) the probed light will relate to the most relevant portion of the imaged scene.

In one or more embodiments the probing is configured to be performed on or near an edge of the variable aperture. To have the probing performed on or near an edge of the variable aperture also have some advantages. Actually, the third advantage of the previous embodiment may be reiterated, but with the conclusion that of the probing affects the image acquired by the image sensor it will at least not affect the most relevant portion of the imaged scene. Another advantage is that the probing will need to have some suspension, and if the probing is performed on or near the edge of the variable aperture the effect of the suspension will be minimized.

In one or several embodiments the light sensor is configured to perform the probing directly by being positioned in the beam path. This as an advantage of providing a direct measurement of the light, with maximum collection efficiency. In other embodiments the probing is performed by means of a light deflector positioned in the portion of the beam path. The deflector is obviously configured to direct light from said portion towards the light sensor, the light sensor being positioned outside of the beam path. An advantage of using a deflector is that it may be smaller in size than a light sensor and it will require no wiring. As such it may be readily arranged as either a stationary or a movable component. Several examples of this will be given in the detailed description.

For the purposes of increasing collection efficiency or to improve the collection of light from different directions the deflector may, in one or several embodiments, have a concave shape and be inclined in relation to the optical axis of the lens system, so as to direct light from the probed portion towards the light sensor. In such an embodiment the light sensor may preferably be positioned outside of the beam path, for obvious reasons.

In other embodiments having a similar purpose, the deflector may have a flat surface, inclined in relation to the optical axis of the lens system, so as to direct light from the probed portion towards the light sensor, the light sensor again being positioned outside of the beam path.

In one or any embodiment, the light sensor or the deflector may be suspended on a transparent substrate. A transparent substrate may be arranged in a beam path without introduction of any distortion of the image collected, and without affecting the intensity to any significant extent. In embodiments where the measurement is performed in a night mode a dummy filter (to be explained in the detailed description) may double as transparent substrate.

Instead of being arranged on, the deflector may be formed in the transparent substrate, e.g., through the provision of an inclined surface, a prism shape, or a metallized surface in the substrate. In one such embodiment the deflector is formed as an indentation in the transparent substrate, and in a variant of that embodiment the deflector is configured to direct the portion of the beam path into the transparent substrate, and that the transparent substrate guides the deflected portion towards the light sensor. The multiuse of the transparent substrate, as a deflector, suspension, and light guide, may be an efficient way of realizing the present invention.

The deflector may have a reflectivity of above 90%, such as above 95% or above 99%, wherein it will essentially block any light impacting on it from reaching the image sensor. In embodiments where the deflector is made from metal or have a metallized surface the reflectivity will be close to 100%. In other embodiments the deflector may have a reflectivity of less than 90%, although having a deflector that transmits light is presently not a preferred embodiment since there is not much to gain from such a solution.

According to another aspect, a lens system is provided with an arrangement as described above. According to a further aspect a video camera having an arrangement according to any version described above is presented.

DETAILED DESCRIPTION OF EMBODIMENTS

Figure 1:
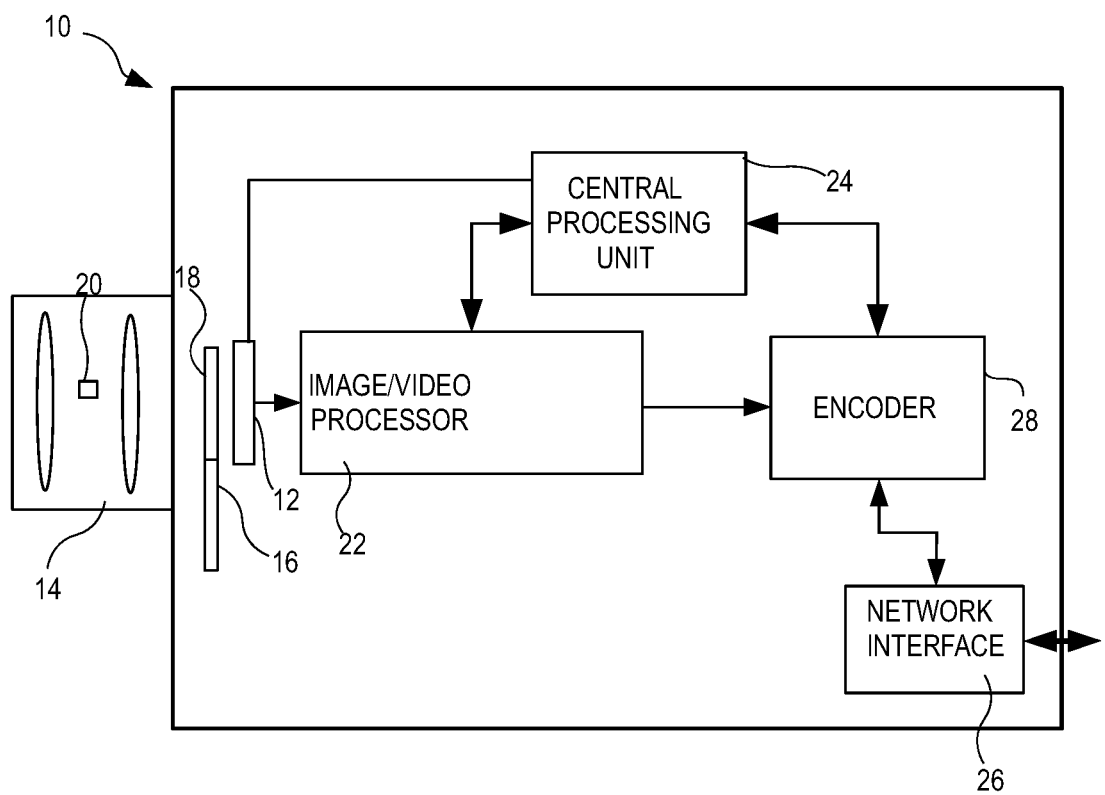
FIG. 1 is a schematic view of a camera setup.

FIG. 1 illustrates a camera setup provided with an arrangement according to one embodiment according to various embodiments thereof. A surveillance camera 10 has an image sensor 12 and imaging optics 14. At least one spectral filter, the IR-cut filter 16, is arrangeable in front of the image sensor 12, and may be switched between a position in which the image sensor is covered by the filter and one in which it is not. The phrase "the image sensor is covered by the filter" should be construed as that the filter is arranged such that it affects all radiation reaching the image sensor. It may be arranged immediately in front of the image sensor, such that it more or less literally covers it, but it may as well (instead) be arranged in other locations, such as within the imaging optics, in front of the imaging optics 14, etc. From a practical standpoint, the IR-cut filter 16 is arranged where there is enough room for the filter and the control mechanism, and where it is reasonably well protected from physical tampering. Anyway, in this way it is possible to control a spectral region of the light (or radiation in the case of any UV or IR being transmitted) reaching the image sensor 12. FIG. 1 also shows a dummy filter 18, taking the place of the IR-cut filter 16 as it is removed.

Figure 2:
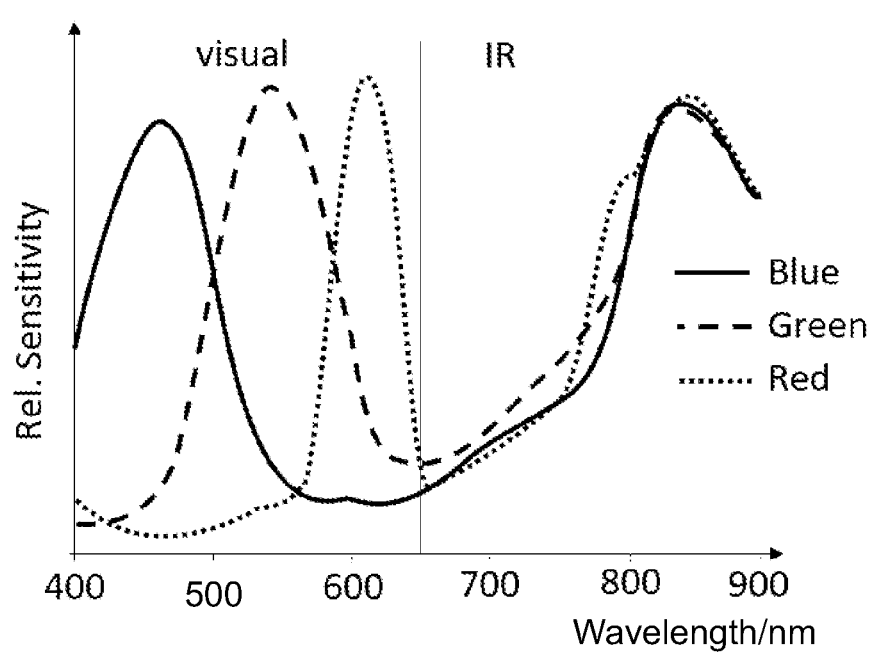
FIG. 2 is a schematic diagram illustrating the spectral response of a standard sensor chip.

Referring briefly to FIG. 2, when the IR-cut filter 16 is arranged in front of the image sensor 12 during day-mode operation the entire IR-portion of the spectrum is removed, meaning that a signal measured by the red, green, and blue channel, respectively, may be resolved and converted to a color image. The incident light is separated into different color channels by use of a color filter array arranged in front of, or even combined with, the image sensor 12. A Bayer filter is a color filter array commonly used for this purpose. Notably, as also indicated in FIG. 2, each color channel has a spectral response in the NIR spectral region, meaning that each color filter in the color filter array (the Bayer filter) will have a transmission in the IR-region) and as the IR-cut filter 16 is removed from the image sensor 12, in night-mode operation, this part of the spectrum will be incident on the image sensor as well. This will significantly increase the amount of collected radiation at the cost of losing the possibility to reproduce a true color representation of the scene, which is why it is common practice to use a grayscale representation in night-mode imaging. In this night-mode operation an image quality may be further increased by arranging an IR-illumination source, providing an "invisible" illumination having the desired effect while still not being visible or disturbing to the human eye. As the IR-cut filter 16 is removed, when transferring to night-mode imaging, it is common that a dummy filter 18 takes its place. The purpose of the dummy filter 18 is to mimic the refraction caused by the IR-cut filter, such that image focus is maintained the same for day-mode and night mode imaging.

Returning to FIG. 1 and to the first embodiment, there is a light sensor 20 arranged in or near the aperture plane, in the beam path heading towards the image sensor 12. The light sensor 20 only probes a small portion of the beam path. In the aperture plane, rays of light heading to every portion of the image sensor 12 are present in every portion of the cross section. This has two beneficial results. 1) Even if the insertion of a light sensor would block a portion of the beam path, this would only result in a small reduction in a total intensity reaching the image sensor, and it would not result in any local shadowing effect of the image sensor. 2) Irrespective of the area of the beam path being probed, the result would be proportional to the total intensity reaching the image sensor 12. The light sensor 20 may be configured to measure in different wavelength regions, or by selecting a light sensor 20 with a particular spectral response. For the purposes of the present invention, where light in the visual spectral region is of particular interest for several embodiments, it is preferable that the light sensor 20 is configured so as to have a spectral response in the visual region only. There is an added benefit in having the filter close to the plane of the diaphragm (sometimes referred to as aperture plane or aperture stop), since in a normal configuration the aperture plane represents a position where there is no spatial correlation with the plane of the image sensor 12. Sometimes this is referred to as the aperture stop, wherein the aperture stop limits how much light from each point of the object that reaches a conjugate image point (the sensor in our case). Aperture stop thus defines a plane in the beam path, and sometimes the term "aperture plane" is used for the same feature. A feature of this plane is that it is a position in which alterations in a size of a diaphragm aperture will affect the entire image plane equally, at least in an ideal situation. This may for some application be a suitable position for the inventive arrangement. A smaller probing element may be of a smaller size, since all light passes quite small aperture. However, the space available is often very limited. For some lens systems the movable lens section will almost touch the stationary lens section in one extreme. For such lens systems the arrangement may have to be positioned elsewhere.

The aperture plane (sometimes referred to as the plane of the diaphragm or aperture stop), represents a position where there is no spatial correlation with the plane of the image sensor. Sometimes this is referred to as the aperture stop, wherein the aperture stop limits how much light from each point of the object that reaches a conjugate image point (the sensor in our case). Aperture stop thus defines a plane in the beam path, and therefore the term "aperture plane" is used for the same feature. A feature of this plane is that it is a position in which alterations in a size of a diaphragm aperture will affect the entire image plane equally, at least in an ideal situation. This may therefore be a suitable position for the inventive arrangement. In more than one location it is stressed that the light sensor (or a light guide directing or leading light to the light sensor) is arranged in or near the aperture plane. "Near" may be considered to introduce a degree of vagueness, so it will be defined a bit further. The ideal properties of the aperture plane, that there is light heading towards every point of the image plane in every point of the aperture plane are the properties being utilized in the present embodiments. However, the properties may be good enough within an interval around the aperture plane as well (i.e., closer to the image plane or closer to an object plane). For the particular optics of the present embodiments this would correspond to an interval extending 2-3 mm on either side of the aperture plane (for an optics length of about 50 mm). Now, "2-3 mm" is excellent since it is readily verifiable and thus adds to clarity. However, it is a measure that will vary with properties, such as f-number and focal length, of the lens system being used. It is always preferable to position the arrangement IN the aperture plane, but the definition of near becomes relevant in applications where the aperture plane is already occupied by other components (typically an iris aperture or other variable aperture). Another approach would be to consider that the closer the light sensor is moved towards the image sensor, the sharper of a shadow it will cast. In (or near) the aperture plane it will, even if it only occupies a small portion if the aperture plane, affect the light reaching the image plane homogenously over the image plane. This may be used to define what "near" is indirectly, e.g., in that the light sensor should be sufficiently close to the aperture plane (on front of or behind) so as not to generate an inhomogeneity in the image plane exceeding 10%. The threshold could in some embodiments be set to lower values, such as 5%, or even lower, such as 1%. This measure is possible to verify in a measurement (much as the 2-3 mm) but it also has the added benefit of being independent of properties of the lens system being used.

With the setup of this, and other, embodiments the assessed light will follow any changes in the imaging optics, such as changes in zoom, since it will result in a measure of all light heading towards the sensor. Further to this, it will not include light not heading for the sensor, which is good since such light will not—and should not—affect exposure settings and evaluations of whether a switch from night-mode to day-mode is advisable or not. The skilled reader realizes that some embodiments are better suited for mode switches, since the amount of light collected is comparatively low. When it comes to controlling exposure there are more appropriate solutions, such as using the image sensor itself.

If required the integration time, i.e., the measuring time or exposure time, of the light sensor can be quite long, from fractions of a second, up to seconds, several seconds, or even minutes, depending on the situation. Consequently, light sensors enabling such long integration times would be beneficial to use when needed. In situations where the amount of light is low (and longer integration times are preferred), light sensors having a low internal noise are preferred—for obvious reasons.

Figure 3:
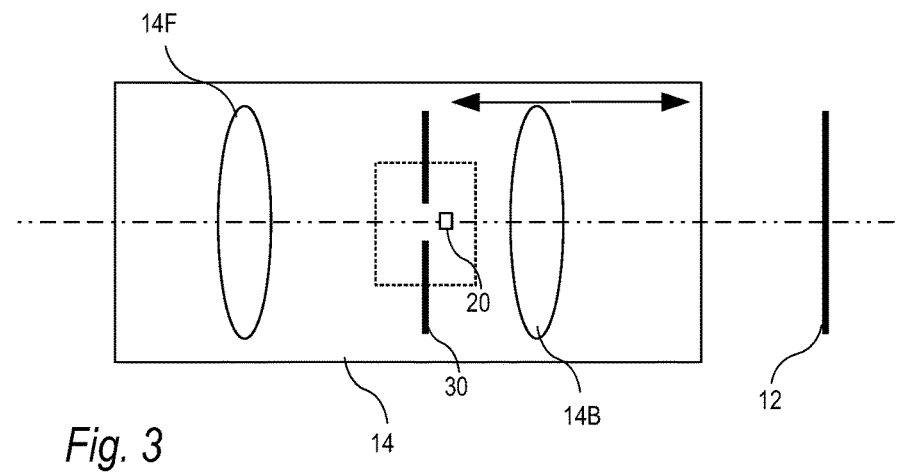
FIG. 3 is a schematic sectional view of a lens system having an arrangement.

FIG. 3 illustrates a more detailed view of the arrangement according to the first embodiment arranged in a lens system 14 having two lens units, 14F and 14B. In the drawing an aperture (e.g., an iris diaphragm) is illustrated, as well as an image sensor 12 for reference. The dotted rectangle is added to aid the interpretation of later drawings. The light sensor 20 is shown being situated in the middle of the beam path, on the optical axis. Notably, two features are not shown. The light sensor 20 must be suspended in something, and the straightforward solution is a thin glass plate, e.g., an optical flat adequate quality. Also, the light sensor would be connected by means of wires, and such wires should preferably be as thin as possible. I may be beneficial for such wires to follow a curve rather than a straight line as they pass the beam path, to eliminate a potential cause for discernable diffraction patterns in the image plane (on the image sensor).

Figure 4:
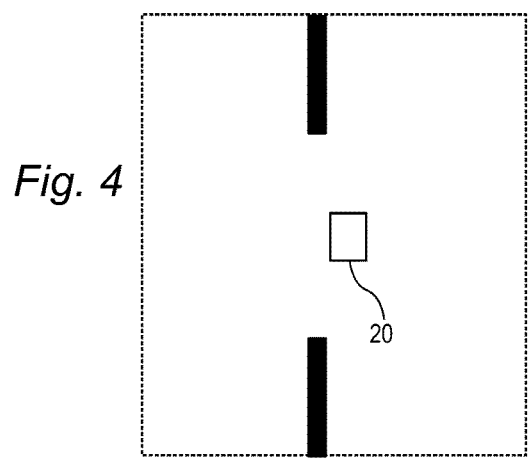
FIGS. 4-7 are cutouts of an area around an aperture plane.

FIG. 4 is a further close-up of FIG. 3.

Figure 5:
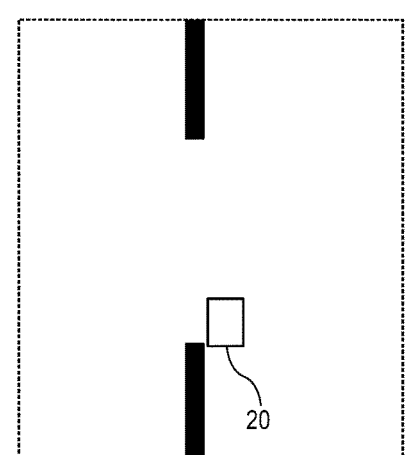

FIG. 5 illustrates an embodiment where the light sensor 20 is arranged closer to an edge of the aperture opening.

Figure 6:
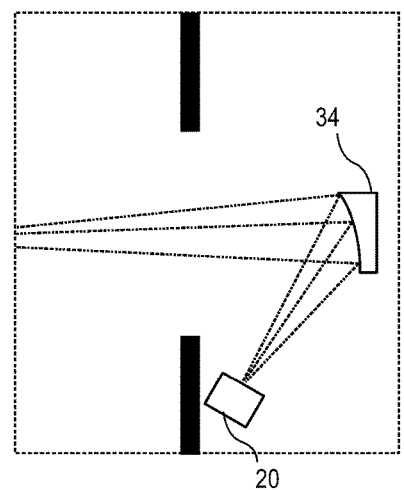

FIG. 6 illustrates an embodiment where the light sensor 20 consists of further guide means 34 for guiding the small portion of the beam being probed (the probed light) towards the measuring entity, i.e., the light sensor 20. In FIG. 6 the guide means 34 is a reflective concave surface serving a dual purpose of both directing the probed light towards the light sensor as well as focusing it on the same. The reflectivity of the guide means 34 may be anything from 100% and downwards, yet as soon as it is significantly lower it has to be optically negligible, that is, it should not cause any net refraction of light affecting light reaching the image sensor 12. This may be accomplished by corrective lenses or by means of shaping the back surface of the guide means.

Figure 7:
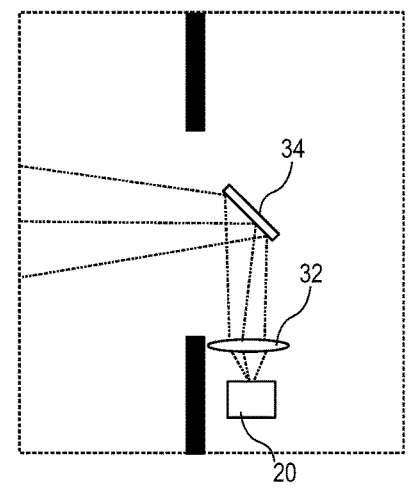

In the embodiment of FIG. 7 the guide means 34 is constituted by a flat surface arranged to reflect a portion of the beam towards the light sensor, and since a flat surface is used, collective optics, in the form of a focusing lens 32 is also added to the light sensor 20. The necessity and properties of such collective optics may depend on a size of the light sensor, or the guide means, and of a distance between the two.

In either embodiment, the guide means 34 is designed to ensure that light emanating from every part of the scene is represented in the light reaching the light sensor, and a prominent feature of the aperture plane is that light emanating from every part of the scene is present in every point of the plane. Consequently, wherever the guide means 34 is arranged (in or near the aperture plane) it will have access to light of the desired properties, meaning that that part of the selection is readily accomplished. Care must be taken, however, that the guide means by its shape or other properties does not favor light from a particular direction, since that would skew the measurement. Instead of the exemplified design of the guide means it could have the shape of a curved convex surface, and it could essentially be formed from a metallized sphere. This shape would not direct all light falling in on it towards the light sensor, and it would result in an increased amount of scattered light in the lens system, yet it highlights that the invention is more about the position of the sensor (or the guide means) in the aperture plane than its design. Irrespective of shape it would be advisable to ensure that surfaces not involved in directing light towards the light sensor 20 are either provided with non-reflective properties or minimized in order to minimize any generation of unwanted reflections or straylight affecting the image acquired by the image sensor 12.

The reflective surface may be positioned anywhere in the beam path, and it is not restricted to being position on the optical axis.

The reflective surface of FIG. 6 or 7 may be attached to a glass plate as the light sensor 20 was exemplified to be in the previous embodiment, but it may also be shaped as a protrusion or indentation—or a combination thereof—of the actual glass plate. A reflective element could also be formed inside the glass plate. The glass plate may in any embodiment be replaced by a plate from another transparent material, such as fused silica, polycarbonate, etc. If the reflective surface is formed from a metalized sphere or similar, it could be arranged on such a glass plate as well, or on a thin rod. The glass plate could be a separate component, but it could also be provided by the previously mentioned dummy filter 18.

Figure 8:
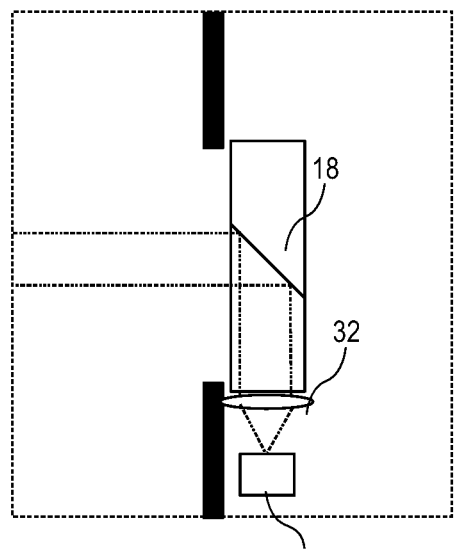
FIG. 8 is a cutout of a still further embodiment of the present invention.

Such an embodiment is illustrated in FIG. 8. In this embodiment the glass plate may assist in guiding the light from the portion of the beam path to the light sensor 20, and the lens 32 may not even be needed. If needed it could be provided by a shape formed in the glass plate rather than as a separate element.

Returning to FIG. 1, the video camera has a housing 10. In FIG. 1 the housing is rectangular, yet it should be noted that the camera housing may take many different forms, and for the purposes of the present embodiments any known form may be used (not excluding unknown forms, unless they make it impossible to realize the invention). Furthermore, the functions performed by the camera may be affected in different units, such that an image is collected in one physical location and transferred for processing via a wire (or wireless) to another unit. Such approaches are not uncommon in applications where it is a benefit that the image collection portion of the camera is kept as small as possible. An image processor or video processor 22 (or a combination thereof) is arranged to process image data collected by the image sensor 12, and to feed it forward to an encoder 28. A central processing unit 24 is arranged to control the processes, and in FIG. 1 the central processing unit 24 represents all control units of the camera, although in a practical installation the processing control may be distributed in different units. In most cases the camera (or one of the units, referring to the above text) will also comprise a network interface 26 for communication beyond the constraints of the camera. The above description is understandably a very simplified account for a modern video camera, and for a more detailed knowledge the interested reader may turn to the product portfolio of the present applicant.

The invention claimed is:

1. An arrangement for determining an amount of light reaching an image sensor of a video camera, said video camera comprising an imaging lens system guiding a beam path towards the image sensor and having an aperture plane where a variable aperture is arranged, wherein the arrangement comprises:
   a light sensor arranged to directly receive and probe light intensity continuously from a portion of the beam path,
   wherein the light sensor is located in the beam path and the aperture plane of the imaging lens system, or is located in the beam path and near the aperture plane so as not to generate an inhomogeneity in the image plane exceeding 10%, and
   wherein the light sensor does not comprise any optical elements arranged to redirect light from the beam path.

2. The arrangement of claim 1, wherein the light sensor is located on or near an optical axis of the lens system.

3. The arrangement of claim 1, wherein the light sensor is located on or near an edge of the variable aperture.

4. The arrangement of claim 1, wherein the light sensor is suspended on a transparent substrate and neither the light sensor nor the transparent substrate are in contact with any optical element of the video camera.

5. A lens system comprising an arrangement for determining an amount of light reaching an image sensor of a video camera, said video camera comprising an imaging lens system guiding a beam path towards the image sensor and having an aperture plane where a variable aperture is arranged, wherein the arrangement comprises:
   a light sensor arranged to probe light intensity continuously from a portion of the beam path,
   wherein the light sensor is located in the beam path and in or near the aperture plane of the imaging lens system so as not to generate an inhomogeneity in the image plane exceeding 10%, and
   wherein the light sensor does not comprise any optical elements arranged to redirect light from the beam path.

6. A video camera comprising an arrangement for determining an amount of light reaching an image sensor of a video camera, said video camera comprising an imaging lens system guiding a beam path towards the image sensor and having an aperture plane where a variable aperture is arranged, wherein the arrangement comprises:
   a light sensor arranged to probe light intensity continuously from a portion of the beam path,
   wherein the light sensor is located in the beam path and in or near the aperture plane of the imaging lens system so as not to generate an inhomogeneity in the image plane exceeding 10%, and wherein the light sensor does not comprise any optical elements arranged to redirect light from the beam path.

* * * * *